United States Patent
Kapur

(10) Patent No.: US 7,240,049 B2
(45) Date of Patent: Jul. 3, 2007

(54) SYSTEMS AND METHODS FOR SEARCH QUERY PROCESSING USING TREND ANALYSIS

(75) Inventor: Shyam Kapur, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 402 days.

(21) Appl. No.: 10/712,307

(22) Filed: Nov. 12, 2003

(65) Prior Publication Data

US 2005/0102259 A1    May 12, 2005

(51) Int. Cl.
*G06F 17/30* (2006.01)

(52) U.S. Cl. .......................... 707/3; 707/101
(58) Field of Classification Search ................ 707/1–7; 705/1–11
See application file for complete search history.

(56) References Cited

U.S. PATENT DOCUMENTS

| | | | |
|---|---|---|---|
| 6,006,321 A | 12/1999 | Abbott | |
| 6,076,088 A | 6/2000 | Paik et al. | |
| 6,363,373 B1 | 3/2002 | Steinkraus | |
| 6,424,973 B1* | 7/2002 | Baclawski | 707/102 |
| 6,539,348 B1 | 3/2003 | Bond et al. | |
| 6,631,372 B1* | 10/2003 | Graham | 707/5 |
| 6,675,159 B1 | 1/2004 | Lin et al. | |
| 6,772,150 B1 | 8/2004 | Whitman et al. | |
| 6,853,982 B2* | 2/2005 | Smith et al. | 705/27 |
| 6,922,691 B2* | 7/2005 | Flank | 707/4 |
| 2002/0188586 A1* | 12/2002 | Veale | 707/1 |
| 2003/0014399 A1* | 1/2003 | Hansen et al. | 707/3 |
| 2003/0069880 A1 | 4/2003 | Harrison et al. | |
| 2004/0111408 A1* | 6/2004 | Caudill et al. | 707/3 |

FOREIGN PATENT DOCUMENTS

WO    WO 02/19147 A1 *    3/2002

OTHER PUBLICATIONS

"Notification of Transmittal of the International Search Report and the Written Opinion of the International Searching Authority, or the Declaration" received in International application No. PCT/US04/37571.

* cited by examiner

*Primary Examiner*—Debbie Le
(74) *Attorney, Agent, or Firm*—Hickman Palermo Truong & Becker LLP

(57) ABSTRACT

Systems and methods for processing search requests include analyzing received queries in order to provide a more sophisticated understanding of the information being sought. In one embodiment, queries are parsed into units, which may comprise one or more words or tokens of the query, and the units are related in concept networks. Trend analysis is performed by sorting the queries into subsets along a dimension of interest and comparing concept networks for different subsets. Trend information is usable to enhance a response of an automated search agent to a subsequently received query.

22 Claims, 5 Drawing Sheets

SYSTEMS AND METHODS FOR SEARCH QUERY PROCESSING USING TREND ANALYSIS

CROSS-REFERENCES TO RELATED APPLICATIONS

The present disclosure is related to the following commonly-assigned co-pending U.S. patent applications: Provisional Application No. 60/460,222, filed Apr. 4, 2003, entitled "Universal Search Interface Systems and Methods"; and Provisional Application No. 60/510,220, filed Oct. 9, 2003, entitled "Systems and Methods for Search Processing Using Clustering of Units." The respective disclosures of these applications are incorporated herein by reference for all purposes.

BACKGROUND OF THE INVENTION

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links (in the case of searching the web), documents and/or references (in the case of a different search corpus) related to the query. The links returned may be closely related, or they may be completely unrelated, to what the user was actually looking for. The "relatedness" of results to the query may be in part a function of the actual query entered as well as the robustness of the search system (underlying collection system) used. Relatedness might be subjectively determined by a user or objectively determined by what a user might have been looking for.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but they share one important characteristic: they are each made up of one concept. The query "new york city law enforcement" is different, however, because it is made up of two distinct concepts "new york city" and "law enforcement".

Human beings also think in terms of logical relationships between concepts. For example, "law enforcement" and "police" are related concepts since the police are an important agency of law enforcement; a user who types in one of these concepts may be interested in sites related to the other concept even if those sites do not contain the particular word or phrase the user happened to type. As a result of such thinking patterns, human beings by nature build queries by entering one or more natural concepts, not simply a variably long sequence of single words, and the query generally does not include all of the related concepts that the user might be aware of. Also, the user intent is not necessarily reflected in individual words of the query. For instance, "law enforcement" is one concept, while the separate words "law" and "enforcement" do not individually convey the same user intent as the words combined.

Current technologies at any of the major search providers, e.g., MSN, Google or any other major search engine site, do not understand queries the same way that human beings create them. For instance, existing search engines generally search for the exact words or phrases the user entered, not for the underlying natural concepts or related concepts the user actually had in mind. This is perhaps the most important reason that prevents search providers from identifying a user's intent and providing optimal search results and content.

As can be seen there is a need for improved search and interface technology that aids in providing results that are more in line with the actual concepts in which a user may be interested and enhances the user's experience.

BRIEF SUMMARY OF THE INVENTION

Embodiments of the present invention provide systems and methods for processing search requests, including analyzing received queries in order to provide a more sophisticated understanding of the information being sought. Queries are parsed into units, which may comprise, e.g., one or more words or tokens of the query. Further analysis is performed on a unit representation of the queries to detect patterns, such as similar combinations of units being used in different queries. Units that occur in queries in conjunction with a similar set of secondary units are grouped into clusters, and a weight may be assigned to the connection between two cluster members based on the degree of similarity of the secondary units associated with each.

According to one aspect of the present invention, clustering is repeated for different subsets of queries, where the queries are sorted into subsets along one or more dimensions. In one embodiment, the dimensions include time, personal characteristics or demographics of the user (e.g., age, gender, known interests, or user profile), a geographic dimension (e.g., physical location or IP address), or a vertical dimension representing a user's activity or context preceding the query (e.g., where the user is on a website when the query is entered). This generates subset-specific clusters (or concept networks) for each subset of the queries. Trend information about a unit or a cluster is generated by comparing corresponding subset-specific concept networks from at least two of the subsets.

The following detailed description together with the accompanying drawings will provide a better understanding of the nature and advantages of the present invention.

DETAILED DESCRIPTION OF THE INVENTION

Figure 1:
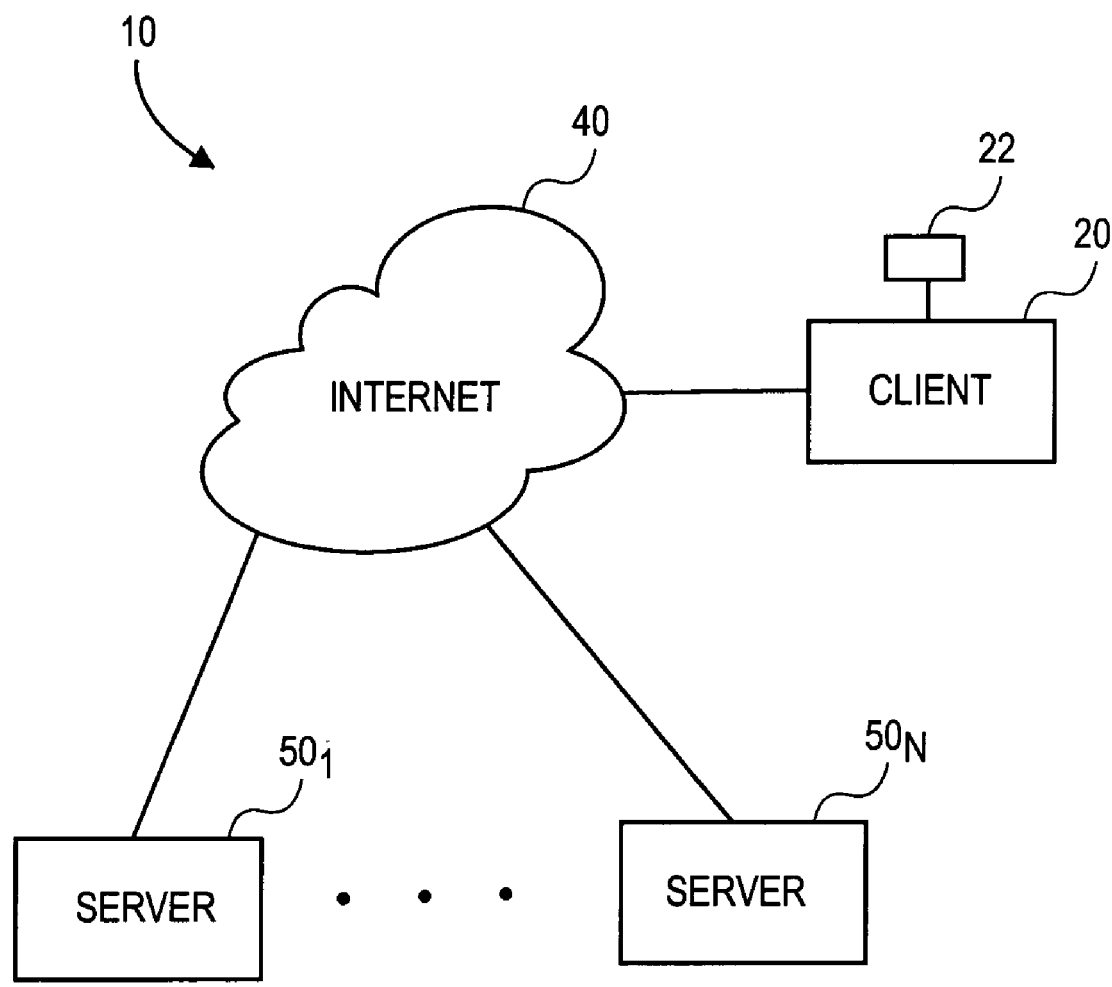
FIG. 1 is a simplified high-level block diagram of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any LAN or WAN connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, PDA, cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

Figure 2:
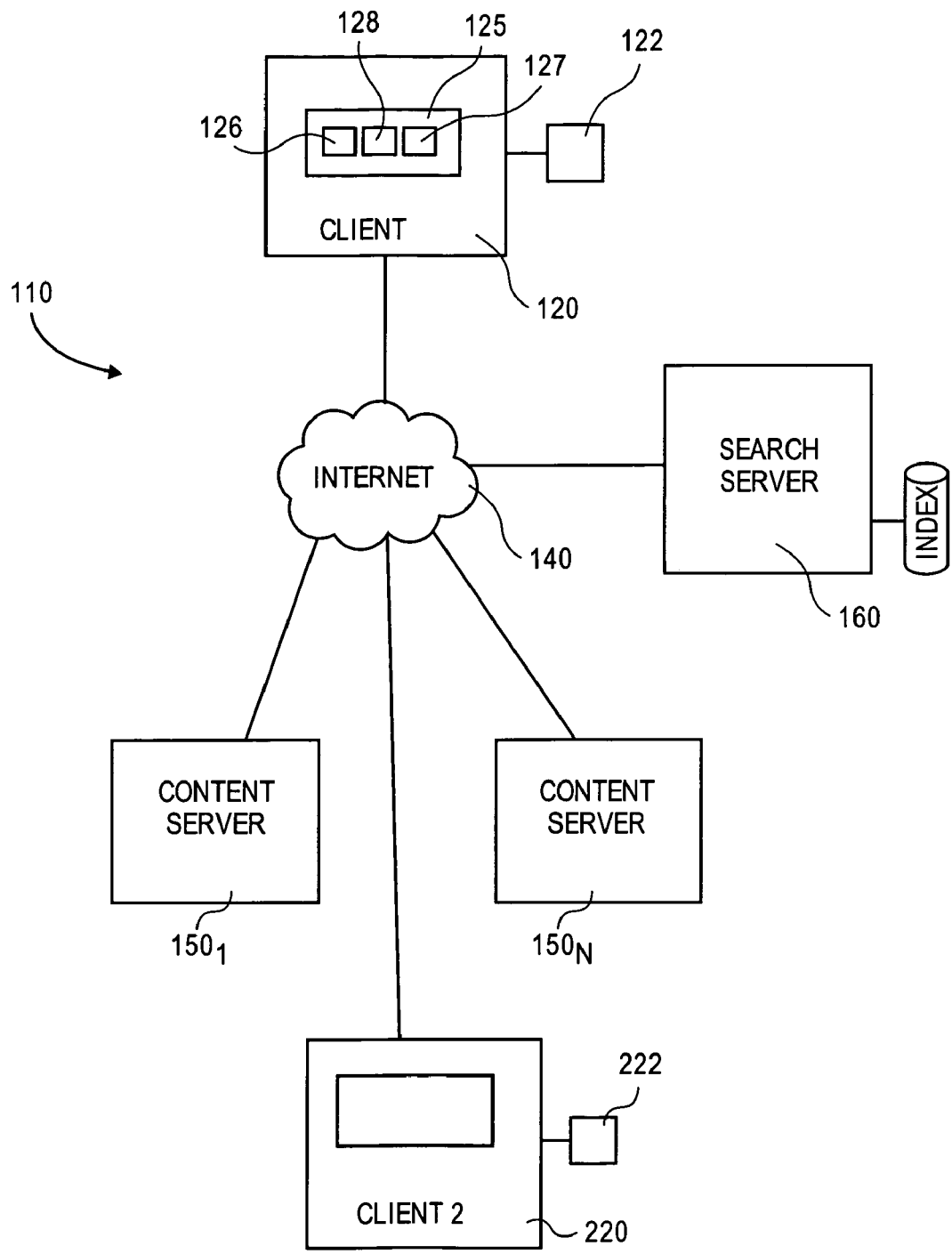
FIG. 2 is a simplified block diagram of an information retrieval and communication network for communicating media content according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser. In some embodiments, client application module 125 provides features of a universal search interface as described in the above-referenced Provisional Application No. 60/460,222.

According to one embodiment, search server system 160 is configured to provide search result data and media content to client system 120, and content server system 150 is configured to provide data and media content such as web pages to client system 120, for example, in response to links selected in search result pages provided by search server system 160. In some variations, search server system 160 returns content as well as, or instead of, links and/or other references to content.

Search server system 160 in one embodiment references various collection technologies for populating one or more page indexes with, for example pages, links to pages, data representing the content of indexed pages, etc. Such collection technologies include automatic web crawlers, spiders, etc., as well as manual or semi-automatic classification algorithms and interfaces for classifying and ranking web pages within a hierarchical structure. In certain aspects, search server system 160 is also configured with search related algorithms for processing and ranking web pages. Search server system 160 is also preferably configured to record user query activity in the form of query log files.

Search server system 160 is configured to provide data responsive to various search requests received from a client system, in particular search module 126. Server systems 150 and 160 may be part of a single organization, e.g., a distributed server system such as that provided to users by Yahoo! Inc., or they may be part of disparate organizations. Content server system 150 and search server system 160 each include at least one server and an associated database system, and may include multiple servers and associated database systems, and although shown as a single block, may be geographically distributed. For example, all servers of search server system 160 may be located in close proximity to one another (e.g., in a server farm located in a single building or campus), or they may be distributed at locations remote from one another (e.g., one or more servers located in city A and one or more servers located in city B).

As used herein, a "server system" typically includes one or more logically and/or physically connected servers distributed locally or across one or more geographic locations. A "server" typically includes a computer system and an associated storage system and database application as is well known in the art.

According to one embodiment, search server system 160 is configured with one or more page indexes and algorithms for accessing the page index(es) and providing search results to users in response to search queries received from client systems 120. In certain aspects, search server system 160 is additionally configured to provide enhanced search query analysis and clustering functionality in response to search requests from client system 120. In other variations, search server system 160 includes all of the content and functionality of content server system 150.

In one embodiment, processes executing on search server system 160 perform contextual analysis of search queries and/or search results and respond with search results grouped so as to reflect different contexts. Many search terms may have different meanings depending on the context intended. For example, if a user performs a search using the term "Java", the intended context is not clear. The user may be interested in the Java computer language, in the Indonesian island of Java, or in coffee (which is often colloquially referred to as java). The present invention advantageously analyzes search queries and/or results and groups results in contexts for display at the user's computer 120. For example, in response to the search term "Java", some embodiments of search server system 160 return search results grouped into three (or more if other contexts are identified) contexts or word senses: Java the computer language, Java the island, and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java", the system of the present invention is configured in one embodiment to group results into contexts for search terms that are not necessarily ambiguous. One example is the results returned for the search term "Hawaii". The term "Hawaii" in and of itself might not be ambiguous; however, the character of the results returned for such a term could be very broad, related to every site that discusses or just mentions Hawaii. To provide more useful results to the user, the system of the present invention preferably organizes search results into contexts by leveraging the knowledge of what the results are actually related to. For example, for Hawaii, the system may return results in various context groupings such as "Hawaii: travel", "Hawaii: climate", "Hawaii: geography", "Hawaii: culture", etc.

In some embodiments, context identifiers are stored in association with page links in the index, so that when a search is performed links can be grouped according to the identifiers. A page link may be associated with multiple context identifiers. Such identifiers are preferably automatically associated with links by the system as users perform related searches; however, the identifiers may also be modified and associated with links manually by a team of one or more index editors. In this manner, knowledge gleaned from numerous searches is fed back into the system to define and re-define contexts to make the displayed search results more valuable and useful to the requesting user.

In one embodiment, algorithms on search server system 160 perform concept discovery or concept analysis of search terms to provide more meaningful results to the user. For example, for the search phrase "New York City" it is fairly clear that the user is interested in sites related to New York City (the city or region) as opposed to any other city in the state of New York. Similarly, for "New York City law enforcement" it is clear that the user is interested in sites related to law enforcement (e.g., segment of jobs) in New York City. However, most search engines would simply search using the individual terms "New", "York", "City", "law" and "enforcement" regardless of the order in which the terms appear in the search phrase. Other search engines might try to find the longest substring in the search phrase that also appears in an index. For example, if the index contained "New York", "New York City" and "New York City law" but not "New York City law enforcement", the search engine would search using "New York City law" and "enforcement", which is not necessarily what the user intended.

Embodiments of the present invention advantageously analyze terms in the search phrase to identify one or more concepts (units) that make up the search query.

Figure 3:
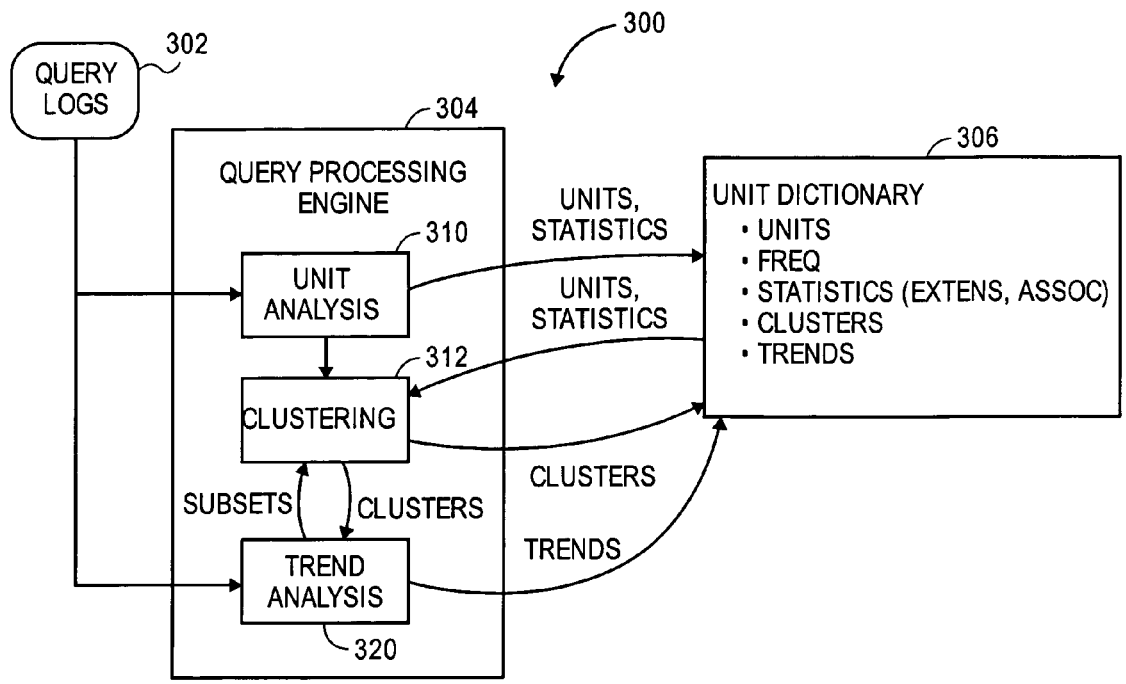
FIG. 3 is a simplified block diagram of a query processing engine according to an embodiment of the present invention.

FIG. 3 is a block diagram of a system 300 for performing concept discovery or concept analysis, including trend analysis, according to one embodiment of the present invention. One or more query log files 302 (or actual queries) are received by a query processing engine (also referred to as a query engine) 304, which generates a unit dictionary 306 as described below. A query log file (or an actual query) may be received from various sources over the Internet or through various network connections, e.g., LAN, WAN, direct links, distribution media (e.g., CD, DVD, floppy disk), etc. Examples of sources include search server system 160 (FIG. 1), or multiple search servers 160 in a distributed network of search servers, and one or more of content servers 150. Query log file sources are typically associated with the same organization or entity, e.g., Yahoo! servers, but need not be. The query log files (also referred to as query logs) are processed by query engine 304 using statistical methods such as may be used in information theory or concepts such as mutual information. In preferred aspects, daily query logs are used, although logs for different time periods, e.g., hours, weeks, etc. may be used as desired. Query logs typically include actual queries submitted by users and may also include additional information for some or all of the queries, such as geographic location of querying users, timestamps, IP addresses of client systems, cookies, type of client (e.g., browser type), etc. Query processing engine 304 processes the various query logs and generates units therefrom. The units and associated statistics such as frequency of occurrence are stored to a memory or database file referred to herein as a unit dictionary 306. Unit dictionary 306 can be used by a search engine in responding to subsequent queries, as described below.

In one embodiment, query processor 304 includes a unit analysis module 310 and a clustering module 312. Unit analysis module 310 processes the query logs 302 to generate units. In preferred embodiments, the system uses the order that search terms are presented to identify the units making up a query. A unit may be a word (e.g., "java") or a group of words that frequently appear adjacent to each other (e.g., "new york city"). Identification of units is described in detail in above-referenced Provisional Application No. 60/460,222. The units generated by unit analysis module 310 are stored in unit dictionary 306; in some embodiments, statistical information (e.g., frequency of occurrence or frequency of occurrence in conjunction with one or more other units) may also be included. Information stored in unit dictionary 306 can be used by a search engine in responding to subsequent queries.

Clustering module 312 performs further analysis of the queries, using the units identified by unit analysis module 310, to create clusters, or concept networks, that indicate similarities among different units. As is generally known in the art, a concept network is a structure for representing relationships in which each concept corresponds to a node and relationships between concepts are represented by lines (or edges) connecting the nodes. The edges may be assigned different weights, so that the weight of an edge reflects the strength or closeness of the similarity between the concepts (nodes). In accordance with an embodiment of the present invention, clusters are generated from units by identifying different units ("members" of the cluster) that tend to appear in queries together with one or more of the same group of "signature" units. The member units may serve as nodes in a concept network. It is to be understood that other representations of connections or relationships between different units or concepts might also be used and that "concept network" as used herein encompasses alternative representations.

For example, suppose that a number of users search for information about their favorite pop-music acts. Typically, these users would construct a query that includes the name of the act (e.g., "Avril Lavigne" or "Celine Dion") and also some other words reflecting the type of information sought, such as "lyrics", "mp3", "guitar tabs", "discography", and so on. Clustering module 312 analyzes these queries and determines that "lyrics", "mp3", "guitar tabs", "discography", and so on are "signature" units for a cluster whose members include the names of different pop-music acts. Examples of specific techniques for creation of clusters that may be implemented in clustering module 312 are described in the above-referenced Provisional Application No. 60/510,220. Clustering module 312 advantageously stores cluster information including data related to member units and signatures in unit dictionary 306. Thus, the information available in unit dictionary 306 includes information about the units and their "neighborhoods" (i.e., other units that appear in queries with a given unit) as well as relationships to other units that may have similar neighborhoods.

In preferred embodiments, clusters created by clustering module 312 tend to reflect real-world relationships of concepts (e.g., grouping units that belong to a common category), even though query processing engine 304 need not be provided with real-world knowledge or semantic information about particular units or queries. For example, one cluster might include "New York City", "San Francisco", and "Chicago", and the signature for that cluster might include "hotel", "restaurant", and "night club". Such a cluster would reflect that New York City, San Francisco, and Chicago are all travel destinations (or cities), but query engine 304 (FIG. 3) is not required to possess any prior knowledge of the concept "destination" (or "city"). This conceptual knowledge can grow automatically from analyzing patterns of queries. It is to be understood that where the present specification labels clusters with terms that carry semantic meaning to humans, this is a convenience to facilitate understanding of the present disclosure. In practice, any cluster labeling scheme used by query engine 304 or unit dictionary 306 need not have this property; for instance, a cluster label could simply be a number, a pointer to a signature for the cluster, and so on.

A unit might belong to multiple clusters; for example, an ambiguous unit such as "java" could end up in a "computer programming" cluster, a "food and drink" cluster, and a "travel" or "places" cluster. In some embodiments, there may be units that do not belong to any cluster.

In accordance with an embodiment of the present invention, query processing engine 304 also includes a trend analysis module 320 that looks for trends in the queries along various dimensions, such as time, geography, user demographics, user history or context (referred to herein as a "vertical" dimension), etc. Trend analysis module 320 advantageously leverages the functionality of unit analysis module 310 and clustering module 312 to perform concept analysis and/or concept discovery on different subsets of the queries, then compiles the results. The resulting trend information is advantageously added to unit dictionary 306.

Unit dictionary 306 may be implemented in any format and stored on any suitable storage media, including magnetic disk or tape, optical storage media such as compact disk (CD), and so on. The content of unit dictionary 306 advantageously includes the units, as well as additional information about each unit, such as statistical data generated by unit analysis module 310, cluster information as determined by clustering module 312, and trend information generated by trend analysis module 320. Information related to units, clusters, and/or trends can be used by a search engine to respond to subsequent queries.

Figure 4:
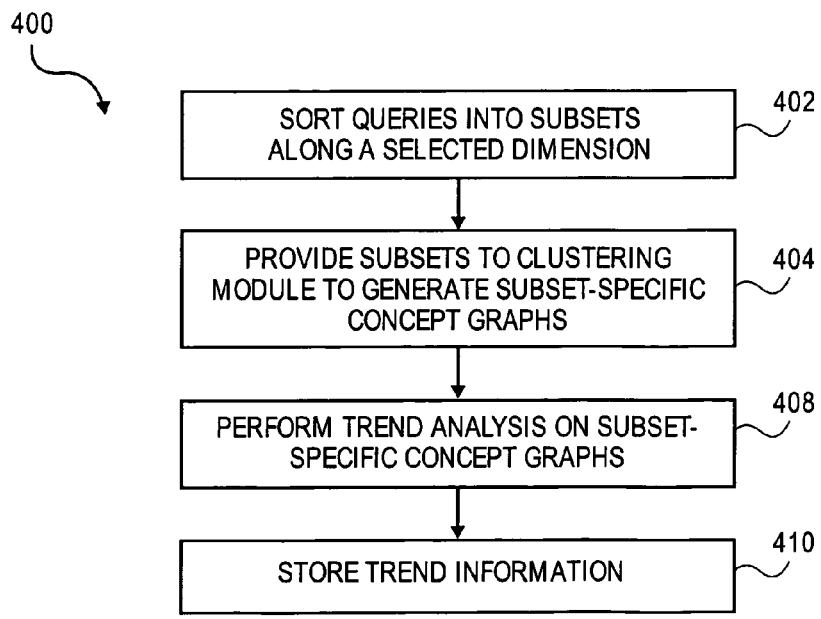
FIG. 4 is a flow chart of a process for performing trend analysis according to an embodiment of the invention.

FIG. 4 is a flow chart of a process 400 that may be performed by an embodiment of trend analysis module 320. At step 402, queries contained in the query logs are sorted into subsets along a selected dimension. The dimension may be defined based on any information about the query that the log file provides, and queries may be divided into any number of subsets along a given dimension.

As one example, a "time" dimension may be used if the query log provides information related to the time of submission for various queries is known. Along the time dimension, queries can be divided, e.g., by week or by month for analyzing trends in user interests over time. Queries can also be divided based on time of day (e.g., morning, afternoon, evening, late night), weekday vs. weekend or holiday days, seasons, etc. Numerous variations are possible; as just one example, queries received between 8 a.m. and 10 a.m. can be aggregated over a week, a month, or another desired period. In some embodiments, time of day is determined according to the search server's local time. In the case where a search service provides multiple servers to serve different geographical regions, the server's local time is approximately representative of the user's local time. In other embodiments, the user's local time may be used.

As another example, a "geography" dimension may be used if the query log provides information about the geographical origin of the query. Geography may relate to physical geography. For example, some IP addresses may be used to identify a likely country of origin of the query; a user profile for the user who submitted the query may be used to determine where the user resides; or queries may be sorted according to whether they were received at mirror sites in different locations or regional/national sites associated with different locations. Alternatively, the geography dimension may represent a "cyber geography" where a user's IP address (or a domain determined from the IP address) is treated as the geographic origin. Physical and cyber geography dimensions may be combined.

As a third example, a "demographic" dimension may be used if the query log provides information about demographic characteristics of the user such as age, gender, etc. Any number and combination of demographic data may be used to define a demographic dimension for trend analysis. For example, a demographic dimension may include one group of "female users who are over 25 and own their homes", another group of "male users who are over 35 and rent", a group of "users under 25 who own cars", and so on.

As a fourth example, a "vertical" or "user history" dimension may be used if the query log provides information (referred to herein as "user history" or "user context") about user activity preceding entry of the query. For example, suppose that a portal site (e.g., the Yahoo! site at www.yahoo.com) includes various areas or "properties" such as a shopping property, a general web directory, a music property, and so on, with each property including a search interface enabling the user to enter queries. Information about which of these properties the user was visiting when the query was entered may be saved and used as the "vertical" dimension. Thus, in one embodiment, the vertical dimension might include one subset of queries that came from users at the "shopping" property and another subset of queries that came from users at the "general directory" property, and so on. In other embodiments, such as where a user has substantially continuous access to a dialog box for entering search queries at any time (one example of such a dialog box is described in above-referenced Provisional Application No. 60/460,222), the user history information might also include a URL or other identifier of a web page that was being displayed when the user entered the query. The vertical dimension might separate queries according to the URL, a portion thereof (e.g., domain name), or information about the content of the page (e.g., information that might be maintained in a page index).

Those skilled in the art will recognize that the foregoing examples of dimensions and subsets are illustrative and not limiting; any number of dimensions and subsets of queries along a given dimension may be used. The sorting of queries along a dimension may include an subset for "unknown" and/or "other" values of the relevant dimension, and this subset may either be analyzed or not, depending on system configuration.

At step 404, each subset of the queries is provided to clustering module 312 to generate one or more subset-specific concept networks. In some embodiments, the existing unit dictionary 306 is used; in other embodiments, the subsets may also be provided to unit analysis module 310 to generate a subset-specific set of units. Unit analysis and clustering analysis are described in detail in above-referenced Provisional Application No. 60/510,220. Clustering analysis is advantageously performed independently for each subset of queries, so that a set of concept networks is generated for each subset. The resulting subset-specific concept networks are returned to trend analysis module 320.

At step 408, trend analysis module 320 performs a trend analysis using the subset-specific concept networks to detect similarities and differences that reflect differing patterns of user behavior along the dimension. These differing patterns are referred to herein as "trends", and trend analysis generally involves comparing clusters (e.g., concept networks) and/or signatures generated from the different subsets to discover such differences. Trends and trend analysis can take a wide variety of forms.

As one example, one trend analysis might compare the relative frequencies of particular search terms or units during different time periods or for different user demographics. The units compared might be, e.g., different member units of a cluster or different signature units for a cluster. Suppose, for instance, that there is a cluster of "singers"; one trend analysis for this cluster might reveal that for users under 21, "Avril Lavigne" is a more popular query term than "Celine Dion" while the reverse is true for users over 35. Or suppose that there is a cluster of "cities" and that the signature of this cluster includes units "employment" and "hotel"; one trend analysis for this signature might reveal that "employment" is searched more often during the week while "hotel" is searched more often on the weekend. (This could reflect, e.g., that users tend to do job searching during the week and vacation planning during the weekend).

In some embodiments, trend analysis may also be used to detect more subtle trends in user interests and behavior. For example, suppose that a celebrity who is well known in one field (e.g., music) decides to enter another field (e.g., politics). The total level of interest in that celebrity might not change much, but there may be shifts in the kind of information that is sought about the celebrity. For instance, the frequency of searches for the celebrity's name plus "song" or "album" might decrease while the frequency of searches for the celebrity's name plus terms like "politics" or "taxes" increases. A comparison of the neighborhoods of the celebrity's name over different time periods would reveal such a trend.

At step 410, trend information is stored, e.g., in unit dictionary 306, for use in responding to subsequent queries. The information may be stored in conjunction with particular units and/or clusters to which the information pertains, in conjunction with signatures or suggestions associated with units or clusters, and so on.

It will be appreciated that the systems and processes described herein are illustrative and that variations and modifications are possible. Process steps described as sequential may be executed in parallel, order of steps may be varied, and steps may be modified or combined. Trend analysis may take place over any number of dimensions simultaneously (e.g., users under age 21 coming from a "shopping" area), and the sorting along a dimension may be as coarse or fine as desired. One subset-specific concept network may be compared to another subset-specific concept network, or different subset-specific concept networks may each be compared to a "global" concept network generated from unsorted queries. Trend analysis may be limited to certain concept networks, e.g., those related to units that are used in a large enough number of queries to generate meaningful data, or units that are used as a basis for suggesting related searches. Trend analysis may be performed on units, clusters, signatures, or any combination thereof.

Like unit and cluster data, trend information is advantageously updated or regenerated from time to time to capture changes in user behavior that may reflect changing user interests (e.g., increasing or decreasing popularity of a given pop-music performer, increasing or decreasing interest in job-hunting vs. travel, etc.).

Figure 5:
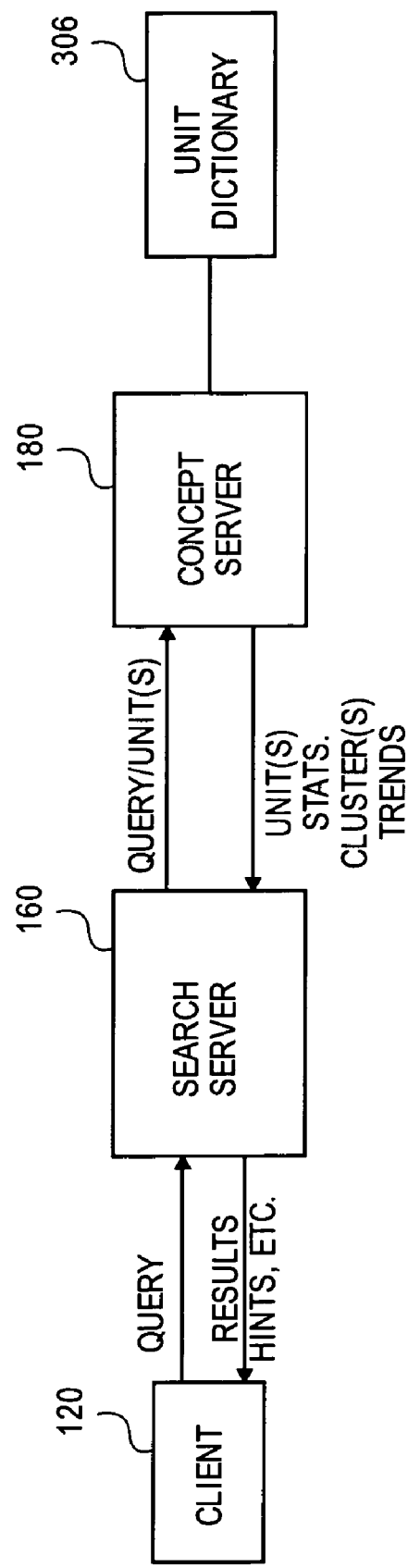
FIG. 5 is a simplified block diagram of a system including a unit dictionary and associated processing intelligence, including a query processing engine in some aspects, according to an embodiment of the present invention.

In another embodiment of the invention, trend information is used to help tailor a search response to a particular user's interest by taking relevant trends into account. FIG. 5 shows a methodology that can be used by system 110 of FIG. 2 to respond to a query. Client 120 transmits a query to search server system 160. Search server system 160 sends the query and/or its constituent units to a concept server 180, which accesses unit dictionary 306. Concept server 180 returns conceptual data related to the query, such as one or more units identified from the query along with statistics and cluster information for the various units, as well as trend information related to the units. This information may be derived, e.g., by hashing the query to identify units contained therein and accessing unit dictionary 306 to retrieve entries for each identified unit. In one embodiment, the returned information includes the units, statistics, clusters, and information about trends that are associated with the query, one or more of its constituent units, or one or more clusters associated with any of the constituent units.

Search server system 160 advantageously uses the conceptual data received from concept server 180 in responding to the query. The results returned by search server system 160 advantageously include results responsive to the user's query to the user along with other related information, such as hints and tips about what the user might want to explore next based on understanding of user needs as captured in units and their extensions and associations, including clusters and trends associated with the units and/or clusters.

For example, suppose that a query includes an ambiguous term, such as "Java," that might be used in more than one context. Such a term might belong to multiple clusters, e.g., a "food and drink" cluster, a "computer" cluster, and a "location" cluster. In some embodiments, search server system 160 may use trend data to shape the response, e.g., by selecting which cluster should be given the most prominent placement. For example, if users who search for "Java" on weekdays are most likely to be interested in the computer language while users who search for "Java" on weekends are most likely to be interested in coffee, the order in which search results are presented might depend on the day of the week; e.g., results related to the computer language could be presented most prominently if it is a weekday while results related to coffee could be presented most prominently if it is a weekend day. (Some techniques for grouping search results based on relevance to different clusters are described in the above-referenced Provisional Application No. 60/510, 220.)

As a second example, suppose there is a four-letter sequence ("WXYZ") that is the name of a rap group and is also the stock-ticker symbol for some corporation. Comparing concept networks or clusters based on queries received when the stock market is open versus queries received when the market is closed might reveal that WXYZ the company is being searched more often in the former case while WXYZ the rap group is being searched more often in the latter case. Accordingly, search results related to the company might be placed before or after results related to the rap group depending on whether the market is open or closed when the query is received.

Figure 6:
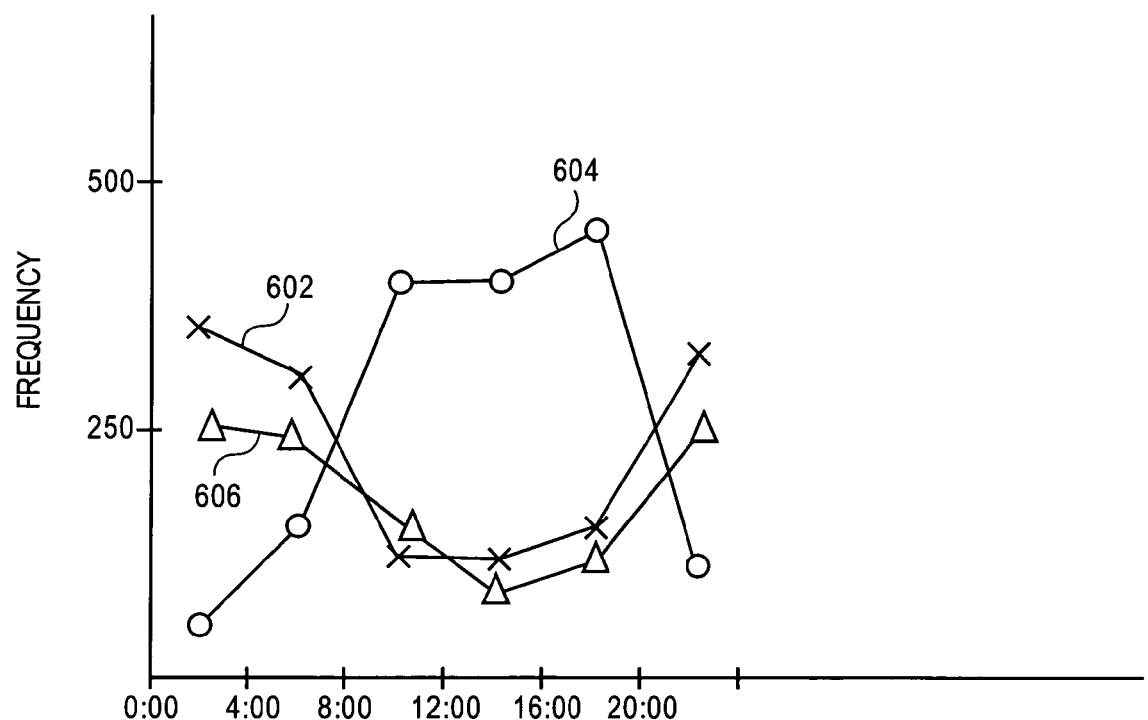
FIG. 6 is a graph of trend data showing frequency of queries as a function of time of day.

As a third example, consider the term "party," which may refer to a social event or to politics, depending on the context. Some queries that include the term "party" may also include another term that resolves the ambiguity (e.g., "Republican party" or "party games"), but other queries may not include such terms. Trend analysis can be used in formulating a response to an ambiguous query. For example, FIG. 6 is a graph of trend data showing the frequency (in arbitrary units) of queries containing the term "party" along a time-of-day dimension (in 4-hour increments). Such trend data might be obtained by analyzing some set of queries in accordance with process 400 described above. Trend data set 602 ("X" symbol) corresponds to queries in which "party" appears together with another term clearly related to social events (e.g., "games", "favors", "supplies"). Trend data set 604 ("O" symbol) corresponds to queries in which "party" appears together with another term clearly related to politics (e.g., "Republican", "Democrat", "candidate"). Trend data set 606 (triangles) corresponds to queries containing "party" in which the ambiguity cannot be resolved by reference to other terms in the query.

One way to resolve the ambiguity in accordance with the present invention is by comparing the shapes of the different trends (e.g., first and/or second derivatives of the data sets shown in FIG. 6) and determining whether the trend for the ambiguous set of queries matches one of the unambiguous sets more closely than the other. In the example shown in FIG. 6, ambiguous trend data 606 is clearly more similar to the "social event" trend data 602 than to the "political" trend data 604. From this, it can be inferred that users who enter an ambiguous query including "party" are more likely interested in social events than in politics, and search results can be presented accordingly, e.g., by presenting results related to social events ahead of results related to politics.

It should be noted that the degree of similarity between two sets of trend data can also be considered and used to establish a confidence level for the inferred intent. In the example shown in FIG. 6, the ambiguous trend data 606 matches the "social event" trend data 602 quite closely, so the confidence level for the inference would be high. In other instances, the confidence level might be lower or higher, depending on user behavior. Such a confidence level may be another factor in formulating a response to a query. For instance, given a high enough confidence level, only results related to social events might be presented initially; in such a case, an option may be provided for the user to retrieve results related to politics.

This example is illustrative, and variations and modifications are possible. For instance, trends along multiple dimensions (e.g., time of day and user age) might be considered together in determining similarity. The trend comparison may be based on any appropriate measure of similarity of two curves, such as actual frequency values, derivatives (rates of change), higher-order derivatives, or any combination thereof.

As a fourth example, consider the term "poison", which may refer to a toxic substance or to a heavy metal band. Again, some queries will include other terms that resolve the ambiguity; for instance, queries such as "rat poison" or "poison control" would be related to toxic substances, while "poison lyrics" or "poison mp3" would be related to the band. Other queries, however, will simply be ambiguous.

An analysis such as that described in the "party" example above might be used to resolve the ambiguity. Another approach involves recognizing that "poison" the band belongs to a cluster of music performers, and that this cluster includes other performers whose names are relatively unambiguous. (E.g., virtually every user who enters "Britney Spears" as a query is interested in the famous singer.) Queries containing unambiguous names of music performers can be used as a "control" group, from which inferences about the behavior of users who are looking for information about music performers can be drawn. This behavior can then be compared to the behavior of users who type in an ambiguous term (e.g., "poison") that might or might not refer to a performer, in order to estimate the likelihood that the ambiguous term is intended to refer to the performer.

Numerous comparisons between the control group and queries containing the ambiguous term are possible. For instance, the fraction of queries containing the ambiguous term "poison" that also contain a term unambiguously associated with music (e.g., "lyrics") may be computed, as well as a corresponding "control" fraction for queries containing an unambiguous name (e.g., "Britney Spears"). The control fraction can be considered as approximating the likelihood that users interested in music would enter a potentially ambiguous query. By comparing this to the frequency of unambiguously music-oriented queries containing "poison", it is possible to infer the likelihood that a user who enters the query "poison" is interested in the band.

To make this example more concrete, suppose that the fraction of queries containing the term "poison" that also contain the term "lyrics" is 0.1, and that the fraction of queries containing the term "Britney Spears" that also contain the term "lyrics" is 0.2. From this, it can be inferred that half the users who enter the term "poison" probably do not intend to refer to the band. In this case, both band-related and toxin-related results would be prominently displayed. A similar analysis can also be made using a control fraction based on a cluster that includes toxic "poison" (e.g., a medicine-related cluster), in order to estimate the likelihood that users searching for the toxic substance would fail to include an ambiguity-resolving term. If the likelihood of ambiguous queries for terms in the medicine-related cluster is small, that would suggest that the ambiguous query "poison" more likely refers to the band.

In addition, user intent can be inferred by comparing the likelihoods of receiving a potentially ambiguous query from a user interested in medicine as opposed to a user interested in music. For example, suppose that 29% of queries from users interested in music are single-unit queries containing just the name of a performer, while only 2% of queries from users interested in medicine contain a single unit. It can be inferred that the user who enters the single-unit query "poison" is more likely interested in the band.

It will be appreciated that more sophisticated variations of this analysis may also be used. For instance, rather than using just one performer to compute the control fraction, more performers might be used (e.g., not just "Britney Spears" but also "matchbox twenty", "Johnny Cash", etc.). Similarly, rather than considering only one ambiguity-resolving term, multiple terms might be used (e.g., not just "lyrics" but also "mp3", "tour", "album", etc.). Similar analyses can also be applied to other ambiguous terms and other clusters.

As a fifth example, suppose a user enters the query "digital cameras." The user might be looking for sites that sell digital cameras or for information (such as product reviews) about digital cameras. Trend analysis of previous queries along various dimensions (including, e.g., the user profile and/or the vertical dimension) can be used to determine which is more likely so that results can be tailored accordingly.

As a sixth example, in some embodiments, search server system 160 might suggest related searches based on trend information. For example, if a user who is known to be under 21 enters a query containing a singer's name, search server system 160 might, in addition to displaying a list of sites relevant to that singer, suggest searches related to one or more other singers identified by trend analysis as being popular among users under 21 (e.g., "Avril Lavigne"). For a 35-year-old user, different singers (e.g., "Celine Dion") might be suggested. In another instance, if a query of "new york city" is entered on a weekday, the suggestion "employment" might be made more prominent than the suggestion "hotel" (if this is consistent with the trend data), while the reverse order might be used if the same query is entered on a weekend.

In some embodiments, trend data might also be used by search server system 160 to infer information about a particular user, such as the user's likely sex, age, or geographic location. Such inferences may involve comparing a number of queries entered by the same user against the trend data to match the user's behavior against different dimensions. It should be understood that these inferences are not guaranteed to be accurate; they reflect how the user behaves and not necessarily who the user is. Any inferences made about a particular user can be used to tailor responses to further queries entered by that user, again using the trend data as one indication of likely user intent. Thus, trend data may be used to customize the response of a search server to the particular user who enters a query.

Trend data may also be used by a provider of search server system 160 in conjunction with advertising decisions such as which advertisement(s) to display on a specific occasion and/or the price to be charged for a particular ad placement.

While the invention has been described with respect to specific embodiments, one skilled in the art will recognize that numerous modifications are possible. For instance, the number and specificity of dimensions and subsets of queries used for trend analysis may vary, and not all queries received need be used for trend analysis. Clusters, signatures and trend information can be defined dynamically, and trend analysis can be performed from time to time (e.g., daily or weekly) to update trend information in response to changing user behavior. In still other embodiments, queries may be processed as they are received so that cluster, signature, and trend data is updated substantially in real time. The automated systems and methods described herein may be augmented or supplemented with human review of all or part of the resulting unit dictionary, including clusters, signatures, trend information related to any or all of the units, clusters, and signatures, and the like.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A method for processing queries, the method comprising:
  sorting queries into a plurality of subsets along a dimension, wherein the plurality of subsets includes a first subset and a second subset;
  generating a first concept network for the first subset of queries;
  generating a second concept network for the second subset of queries;
  performing a comparison between the first concept network and the second concept network, wherein performing a comparison includes performing a comparison of information from the first concept network related to a unit with information from the second concept network related to the same unit; and
  generating trend information based on the comparison.

2. The method of claim 1, wherein the dimension is a time dimension.

3. The method of claim 1, wherein the dimension is defined by reference to one or more demographic characteristics of users.

4. The method of claim 1, wherein the dimension is a geographic dimension.

5. The method of claim 1, wherein the dimension is a vertical dimension representing a user context of the query.

6. The method of claim 1, wherein the step of generating trend information includes generating trend information for said unit relative to the dimension.

7. The method of claim 1, further comprising:
  receiving a first query, wherein the first query contains one or more terms; and
  using the trend information in formulating a response to the first query, wherein a response to the first query contains one or more records.

8. The method of claim 7, wherein the method further comprises:
  using the trend information to resolve an ambiguous term of the first query.

9. The method of claim 7, wherein the method further comprises:
  using the trend information to suggest a second query, wherein the second query contains at least one term different than said first query.

10. The method of claim 7, wherein the method further comprises:
  using the trend information to group the one or more records in the response to the first query.

11. The method of claim 7, wherein the method further comprises:
  using the trend information to select an advertisement for display.

12. A system for processing queries, comprising:
  one or more processors;
  a memory, operatively coupled to the processors;
  a trend analysis module stored in the memory and configured to cause the one or more processors to sort a set of queries into a plurality of subsets along a dimension, wherein the plurality of subsets includes a first subset and a second subset;
  a clustering module stored in the memory and configured to cause the one or more processors to generate a first concept network for the first subset of queries and a second concept network for the second subset of queries; and
  wherein the trend analysis module is further configured to cause the one or more processors to perform a comparison between the first concept network and the second concept network for at least two of the subsets, thereby generating trend information;
  wherein the trend analysis module is further configured to cause the one or more processors to perform a comparison of information from the first concept network related to a unit with information from a second concept network related to the same unit.

13. The system of claim 12, wherein the dimension is a time dimension.

14. The system of claim 12, wherein the dimension is defined by reference to one or more demographic characteristics of users.

15. The system of claim 12, wherein the dimension is a geographical dimension.

16. The system of claim 12, wherein the dimension is a vertical dimension representing a user context of the query.

17. The system of claim 12, wherein the trend analysis module is further configured to cause the one or more processors to generate trend information for said unit relative to the dimension.

18. The system of claim 12, further comprising:
  a response module stored in the memory and configured to cause the one or more processors to receive a first query, wherein the first query contains one or more terms, and to formulate a response to the first query based at least in part on the trend information, wherein the response to the first query contains one or more records.

19. The system of claim 18, wherein the response module is further configured to cause the one or more processors to use the trend information to resolve an ambiguous term of the first query.

20. The system of claim 18, wherein the response module is further configured to cause the one or more processors to use the trend information to suggest a second query, wherein the second query contains at least one term different from said first query.

21. The system of claim 18, wherein the response module is further configured to cause the one or more processors to use the trend information to group one or more records in the response to the first query.

22. The system of claim 18, wherein the response module is further configured to cause the one or more processors to use the trend information to select an advertisement for display.

* * * * *